United States Patent
Yang et al.

(10) Patent No.: US 12,126,990 B2
(45) Date of Patent: Oct. 22, 2024

(54) CHO RESOURCE PROCESSING METHOD, APPARATUS AND SYSTEM

(71) Applicant: ZTE CORPORATION, Shenzhen (CN)

(72) Inventors: Li Yang, Shenzhen (CN); Zijiang Ma, Shenzhen (CN); Yin Gao, Shenzhen (CN)

(73) Assignee: ZTE Corporation, Shenzhen (CN)

(*) Notice: Subject to any disclaimer, the term of this patent is extended or adjusted under 35 U.S.C. 154(b) by 413 days.

(21) Appl. No.: 17/631,144

(22) PCT Filed: Jul. 20, 2020

(86) PCT No.: PCT/CN2020/103060
§ 371 (c)(1),
(2) Date: Jan. 28, 2022

(87) PCT Pub. No.: WO2021/017924
PCT Pub. Date: Feb. 4, 2021

(65) Prior Publication Data
US 2022/0264390 A1    Aug. 18, 2022

(30) Foreign Application Priority Data

Jul. 29, 2019 (CN) .......................... 201910691402.3

(51) Int. Cl.
*H04L 12/00* (2006.01)
*H04W 36/36* (2009.01)
(Continued)

(52) U.S. Cl.
CPC ...... *H04W 36/362* (2023.05); *H04W 36/0072* (2013.01); *H04W 36/24* (2013.01)

(58) Field of Classification Search
CPC ............ H04W 36/0072; H04W 36/24; H04W 36/362; H04W 76/34; H04W 76/19; H04W 72/52
(Continued)

(56) References Cited

U.S. PATENT DOCUMENTS 7,613,457 B2 * 11/2009 Gao ...................... H04W 28/26
370/332
11,805,461 B2 * 10/2023 Hwang ................. H04W 76/19
(Continued)

FOREIGN PATENT DOCUMENTS

| CN | 108632875 | 10/2018 |
| CN | 110536365 | 12/2019 |

(Continued)

OTHER PUBLICATIONS

Ericsson, "On Validity Timer for Conditional Handover in LTE" May 18, 2019.
(Continued)

*Primary Examiner* — Frantz Coby
(74) *Attorney, Agent, or Firm* — Knobbe, Martens, Olson & Bear, LLP

(57) ABSTRACT

Provided are a CHO resource processing method, apparatus and system. The CHO resource processing method includes: sending, by a source base station of a UE, CHO resource change request indication information to at least one CHO target base station of the UE, where the CHO resource change request indication information is configured for indicating the at least one CHO target base station to change a resource of at least one CHO target cell of the UE; and sending, by the source base station, a CHO resource change notification to the UE, where the CHO resource change notification includes information indicating that the resource
(Continued)

Receiving, by a CHO target base station of a UE, CHO resource change request indication information sent by a source base station of the UE, where the CHO resource change request indication information is configured for indicating the at least one CHO target base station to change a resource of at least one CHO target cell of the UE — S6010

Changing, the CHO target base station, the resource of the at least one CHO target cell indicated by the CHO resource change request indication information — S6020 of the at least one CHO target cell is changed and an identifier of the at least one CHO target cell.

16 Claims, 6 Drawing Sheets

(51) Int. Cl.
 *H04W 36/00* (2009.01)
 *H04W 36/24* (2009.01)
(58) Field of Classification Search
 USPC ............................................................ 370/331
 See application file for complete search history.

(56) References Cited

U.S. PATENT DOCUMENTS

| | | | | |
|---|---|---|---|---|
| 2014/0307627 | A1* | 10/2014 | Shatzkamer | ............ H04L 69/22 |
| | | | | 370/328 |
| 2020/0413312 | A1* | 12/2020 | Han | .................. H04W 36/0072 |
| 2022/0386197 | A1 | 12/2022 | Hwang et al. | |
| 2023/0014613 | A1* | 1/2023 | Je | ...................... H04W 36/0064 |

FOREIGN PATENT DOCUMENTS

| | | |
|---|---|---|
| EP | 3 755 057 A1 | 12/2020 |
| EP | 3 860 223 A1 | 8/2021 |
| WO | WO 2018175819 | 9/2018 |
| WO | WO 2018203716 | 11/2018 |
| WO | WO-2020263028 A1 * | 12/2020 ............ H04W 36/36 |

OTHER PUBLICATIONS

Qualcomm Inc., "LTE Conditional HO design considerations" May 17, 2019.
Ericsson, "Configuration of Conditional handover in LTE" May 17, 2019.
International Search Report of Oct. 22, 2020 for International Patent Application No. PCT/CN2020/103060. 6 pages.
European Search Report for European Patent Application No. 20847310.8 dated Jul. 3, 2023.

* cited by examiner

Sending, by a source base station of a UE, CHO resource change request indication information to at least one CHO target base station of the UE, where the CHO resource change request indication information is configured for indicating the at least one CHO target base station to change a resource of at least one CHO target cell of the UE ~S5010

Sending, the source base station, a CHO resource change notification to the UE, where the CHO resource change notification includes information indicating that the resource of the at least one CHO target cell is changed and an identifier of the at least one CHO target cell ~S5020

FIG. 5

Receiving, by a CHO target base station of a UE, CHO resource change request indication information sent by a source base station of the UE, where the CHO resource change request indication information is configured for indicating the at least one CHO target base station to change a resource of at least one CHO target cell of the UE ~S6010

Changing, the CHO target base station, the resource of the at least one CHO target cell indicated by the CHO resource change request indication information ~S6020

FIG. 6

Receiving, by a source base station of a UE, CHO resource change notification indication information sent by a CHO target base station of the UE through actively triggering, where the CHO resource change notification indication information is configured for notifying the source base station that the CHO target base station has determined to change a resource of at least one CHO target cell of the UE ~S7010

Sending, by the source base station, a CHO resource change notification to the UE, where the CHO resource change notification includes information indicating that the resource of the at least one CHO target cell is changed and an identifier of the at least one CHO target cell ~S7020

FIG. 7

Determining, a CHO target base station of a UE, to change a resource of at least one CHO target cell configured by the UE ~S8010

Triggering, by the CHO target base station, to send CHO resource change notification indication information, where the CHO resource change notification indication information is configured for notifying the source base station that the CHO target base station has determined to change a resource of at least one CHO target cell of the UE ~S8020

FIG. 8

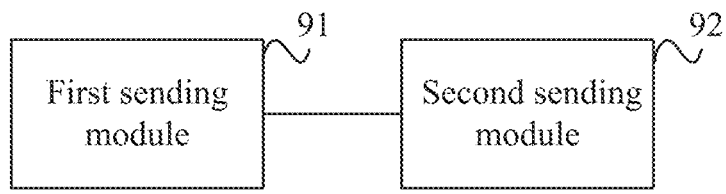

FIG. 9

CHO RESOURCE PROCESSING METHOD, APPARATUS AND SYSTEM

CROSS-REFERENCES TO RELATED APPLICATIONS

This is a National Stage Application, filed under 35 U.S.C. 371, of International Patent Application No. PCT/CN2020/103060, filed on Jul. 20, 2020, which claims priority to Chinese Patent Application No. 201910691402.3 filed with the China National Intellectual Property Administration (CNIPA) on Jul. 29, 2019, the disclosure of which is incorporated herein by reference in its entirety.

TECHNICAL FIELD

The present application relates to a radio communication network, for example, a conditional handover (CHO) resource processing method, apparatus and system.

BACKGROUND

The 5th generation (5G) mobile communication system includes two subsystems: a 5G Core (5GC) and a next generation radio access network (NG-RAN). The NG-RAN includes base stations of two different radio access technology (RAT) types.

The NG-RAN base station maintains the continuity of a communication service of a user equipment (UE) through a handover flow, that is, a communication message of the UE is smoothly transmitted from a source node or cell to a target node or cell as far as possible. The handover flow generally includes three stages: "handover preparation", "handover execution" and "handover completion". In a conventional unconditional handover process, the two stages of "handover preparation" and "handover execution" are continuous in time.

However, an unconditional handover mechanism is designed for the deployment of low-frequency non-dense cells. With the expansion of network evolution capacity, heterogeneous networks are deployed on top of homogeneous networks, and many densely deployed cells lead to many choices in a case of performing handover. Therefore, a conditional handover (CHO) mechanism is introduced in the 3rd generation partnership project (3GPP). In a CHO process, the two stages of "CHO handover preparation" and "CHO handover execution" are separated with a relative large interval in time. The source cell reports a measurement report and a local radio resource management (RRM) strategy based on a radio measurement result of the UE, starts the "CHO handover preparation" process, requests a plurality of potential/candidate target cells to complete a target side resource reservation configuration associated with the "CHO handover preparation" process, and sends CHO pre-configuration information to the UE through air interface radio resource control (RRC) signaling. Subsequently, the UE does not immediately start the "CHO handover execution" process, but waits until a later time when a certain UE locally evaluates that the "actual handover condition" is met, the UE will execute the CHO handover operation on a suitable target cell.

However, in the "CHO handover preparation" process of the CHO process, each potential/candidate target cell needs to reserve and configure communication resources. Only after the UE executes the actual CHO handover in the "CHO handover execution" process, resources reserved by the unswitched target cell will be released, which will occupy a large amount of system resources.

SUMMARY

The present application provides a CHO resource processing method, apparatus and system. which can improve the resource utilization rate of the system, reduce the processing burden of a UE and improve the use experience of a user.

Embodiments of the present application provide a CHO resource processing method. The method includes the following.

A source base station of the UE sends CHO resource change request indication information to at least one CHO target base station of the UE, where the CHO resource change request indication information is configured for indicating the at least one CHO target base station to change a resource of at least one CHO target cell of the UE.

The source base station sends a CHO resource change notification to the UE, where the CHO resource change notification includes information indicating that the resource of the at least one CHO target cell is changed and an identifier of the at least one CHO target cell.

Embodiments of the present application provide a CHO resource processing method. The method includes the following.

A CHO target base station of a UE receives CHO resource change request indication information sent by a source base station of the UE, where the CHO resource change request indication information is configured for indicating the at least one CHO target base station to change a resource of at least one CHO target cell of the UE.

The CHO target base station changes the resource of the at least one CHO target cell indicated by the CHO resource change request indication information.

Embodiments of the present application provide a CHO resource processing method. The method includes the following.

A source base station of a UE receives CHO resource change notification indication information sent by a CHO target base station of the UE, where the CHO resource change notification indication information is configured for notifying the source base station that the CHO target base station has determined to change a resource of at least one CHO target cell of the UE.

The source base station sends a CHO resource change notification to the UE, where the CHO resource change notification includes information indicating that the resource of the at least one CHO target cell is changed and an identifier of the at least one CHO target cell.

Embodiments of the present application provide a CHO resource processing method. The method includes the following.

A CHO target base station of a UE determines to change a resource of at least one CHO target cell configured by the UE.

A CHO target base station triggers and sends CHO resource change notification indication information, where the CHO resource change notification indication information is configured for notifying the source base station that the CHO target base station has determined to change a resource of at least one CHO target cell of the UE.

Embodiments of the present application provide a CHO resource processing apparatus. The apparatus includes a first sending module and a second sending module.

The first sending module is configured to send CHO resource change request indication information to at least one CHO target base station of a user equipment (UE), where the CHO resource change request indication information is configured for indicating the at least one CHO target base station to change a resource of at least one CHO target cell of the UE.

The second sending module is configured to send a CHO resource change notification to the UE, where the CHO resource change notification includes information indicating that the resource of the at least one CHO target cell is changed and an identifier of the at least one CHO target cell.

Embodiments of the present application provide a CHO resource processing apparatus. The apparatus includes a first receiving module and a resource change module.

The first receiving module is configured to receive CHO resource change request indication information sent by a source base station of a UE, where the CHO resource change request indication information is configured for indicating the at least one CHO target base station to change a resource of at least one CHO target cell of the UE.

The resource change module is configured to change the resource of the at least one CHO target cell indicated by the CHO resource change request indication information.

Embodiments of the present application provide a CHO resource processing apparatus. The apparatus includes a second receiving module and a third sending module.

The second receiving module is configured to receive CHO resource change notification indication information sent by a CHO target base station of a UE, where the CHO resource change notification indication information is configured for notifying the source base station that the CHO target base station has determined to change a resource of at least one CHO target cell of the UE.

The third sending module is configured to send a CHO resource change notification to the UE, where the CHO resource change notification includes information indicating that the resource of the at least one CHO target cell is changed and an identifier of the at least one CHO target cell.

Embodiments of the present application provide a CHO resource processing apparatus. The apparatus includes a resource determination module and a fourth sending module.

The resource determination module is configured to determine to change a resource of at least one CHO target cell configured by the UE.

The fourth sending module is configured to trigger to send CHO resource change notification indication information to a source base station of a UE, where the CHO resource change notification indication information is configured for notifying the source base station that the CHO target base station has determined to change the resource of the at least one CHO target cell of the UE.

Embodiments of the present application provide a CHO resource processing system, and the CHO resource processing system includes a source base station and at least one target base station.

The source base station includes the CHO resource processing apparatus shown in FIG. 9.

The at least one target base station includes the CHO resource processing apparatus shown in FIG. 10.

Embodiments of the present application provide a CHO resource processing system, and the CHO resource processing system includes a source base station and at least one target base station.

The source base station includes the CHO resource processing apparatus shown in FIG. 11.

The at least one target base station includes the CHO resource processing apparatus shown in FIG. 12.

BRIEF DESCRIPTION OF DRAWINGS

FIG. 5 is a flowchart of a CHO resource processing method according to an embodiment;

FIG. 6 is a flowchart of another CHO resource processing method according to an embodiment;

FIG. 7 is a flowchart of another CHO resource processing method according to an embodiment;

FIG. 8 is a flowchart of another CHO resource processing method according to an embodiment;

FIG. 9 is a structural diagram of a CHO resource processing apparatus according to an embodiment;

DETAILED DESCRIPTION

Embodiments of the present application are described hereinafter in detail in conjunction with the drawings.

As the development of the 4th generation (4G) long term evolution (LTE) communication system, a 5G communication system includes two sub-systems: a 5GC and an NG-RAN. The 5GC includes network entities or nodes such as an access mobility function (AMF), a session management function (SMF) node and a user plane function (UPF) node. The NG-RAN includes at least two base stations with different RAT types, that is, the next generation eNB (ng-eNB) which continues to evolve smoothly based on the evolved NodeB (eNB), the air interface of the ng-eNB still supports the evolved-universal terrestrial radio access (E-UTRA) RAT system, and a gNB which is designed with a new physical layer air interface. The air interface of the gNB supports a new radio (NR) RAT system, and a logical interface among related network element node entities.

Figure 1:
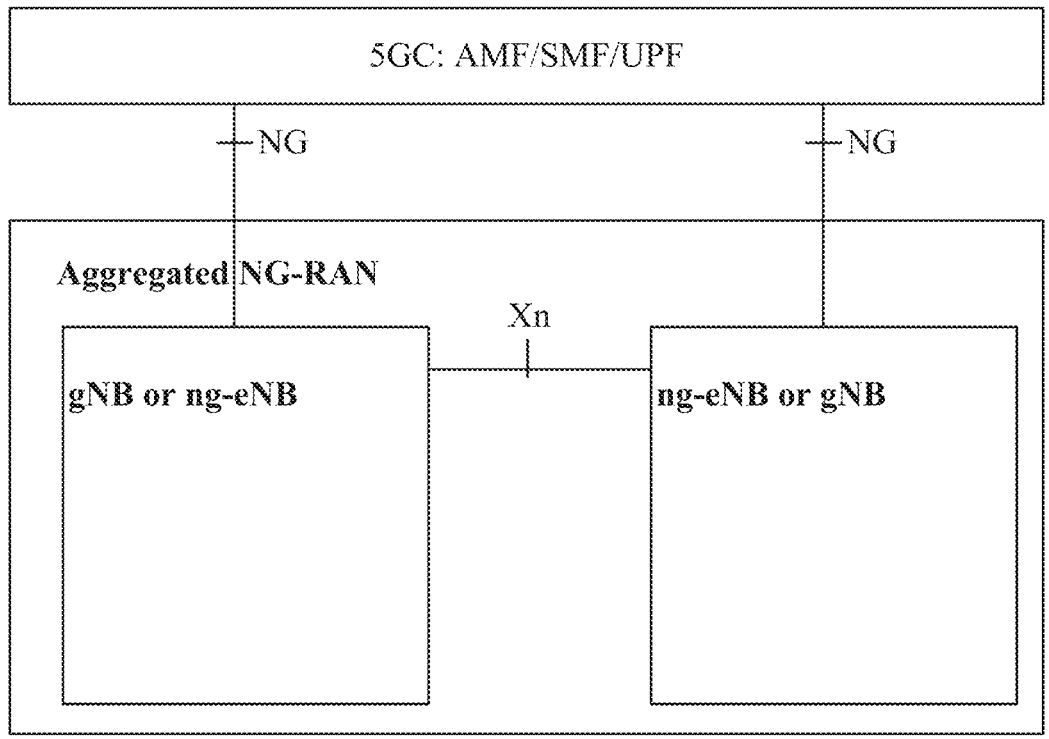
FIG. 1 is a diagram showing a network architecture of an aggregated NG-RAN base station in which air interface protocol stacks of the centralized unit (CU)/distributed unit (DU) are not disaggregated.
Figure 2:
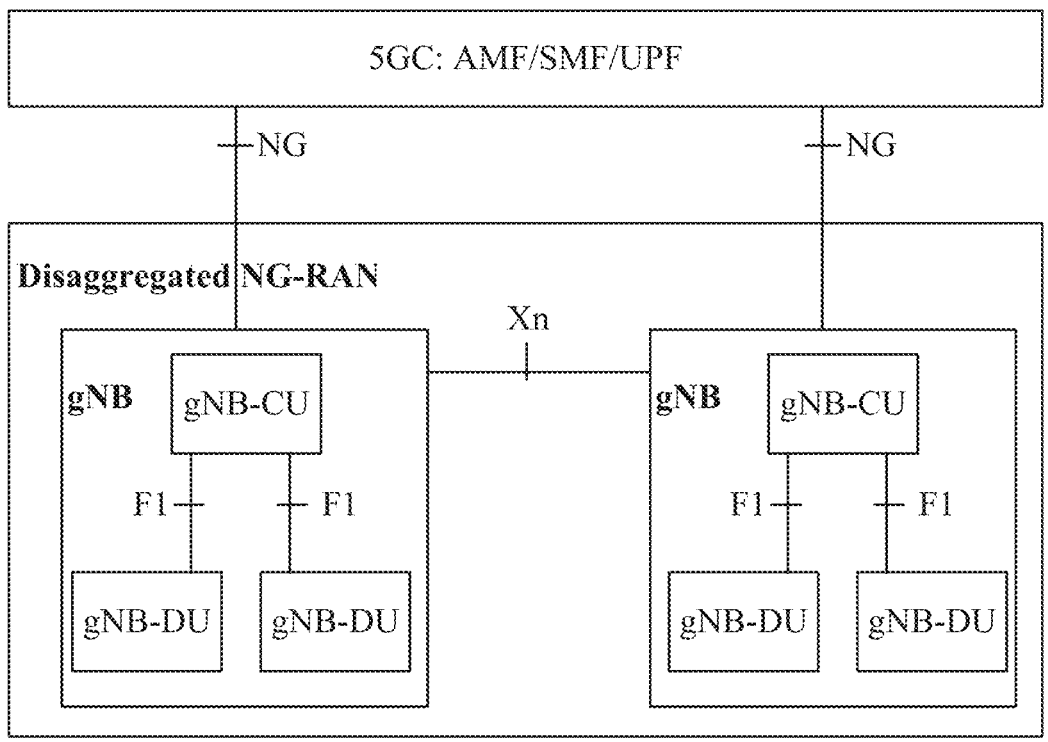
FIG. 2 is a diagram showing an architecture diagram of a disaggregated NG-RAN base station in which the air interface protocol stacks of the CU/DU are disaggregated.

The NG-RAN base stations (gNB or ng-eNB) are connected bidirectionally to the 5GC via a standardized NG interface (including NG-C control plane connection for signaling transmission and NG-U user plane connection for user data transmission). The NG-RAN base stations (gNB or ng-eNB) are bidirectionally connected to each other via an Xn interface (including an Xn-C control plane connection and an Xn-U user plane connection). FIG. 1 is a diagram showing a network architecture of an aggregated NG-RAN base station in which air interface protocol stacks of the centralized unit (CU)/distributed unit (DU) are not disaggregated. FIG. 2 is a diagram showing an architecture of a disaggregated NG-RAN base station in which air interface protocol stacks of CU/DU are disaggregated. Using a currently supported example in which the gNB-CU/DU is disaggregated, a single gNB is disaggregated into a single gNB-CU and a plurality of gNB-DU network node entities, and the gNB-CU is connected bidirectionally to the gNB-DUs over standardized F1 interfaces. A connection mode based on an F1 interface includes F1-C control plane connection and F1-U user plane connection. The gNB that is disaggregated into the CU/DUs and the gNB/ng-eNB that is not disaggregated are each connected to the outside over NG and Xn interfaces. The control planes (CPs) of the plurality of network side logical interfaces (NG, Xn and F1) are connected and configured for transmitting control signaling messages between network entities or network nodes, while the user planes (UPs) of the plurality of network side logical interfaces are connected and configured for transmitting user traffic data (or user traffic data packets). An NG application protocol (NGAP), an Xn application protocol (XNAP) and an F1 application protocol (F1AP) are respectively NG-C control plane logical network layer (RNL) protocol, Xn-C control plane logical network layer (RNL) protocol and F1-C control plane logical network layer (RNL) protocol. Various protocols regulate signaling flow messages on various logical interfaces.

The NG-RAN base station maintains the continuity of a communication service (or session) of a terminal user through a handover flow, that is, a communication context of the terminal UE is smoothly transmitted from a source node or cell to a target node or cell as far as possible. The handover flow usually includes three stages: "handover preparation", "handover execution" and "handover completion". In the "handover preparation" stage, the source service base station cell (hereinafter referred to as the source base station or the source cell) and the target service base station cell (hereinafter referred to as the target base station or the target cell) negotiate based on the signaling flow of the network logical interface to determine the reserved configuration of the communication resources on the target side and the configuration content of an air interface handover command. In the "handover execution" stage, the source service base station cell sends the air interface handover command included in a RRC air interface signaling to the UE, so the UE attempts to carry out the handover operation to the designated target base station cell. In the "handover completion" stage, the source service base station cell and the target service base station cell carry out signaling flow negotiation again to notify a handover result and release the communication resources and UE communication context which are no longer needed by a source side.

In a conventional unconditional handover process, the two stages of the "handover preparation" and the "handover execution" are continuous in time, that is, the time interval is not large. The source cell reports a measurement report and a local radio resource management (RRM) strategy based on the radio measurement result of the terminal UE, and starts the "handover preparation" process. When the designated target base station cell (usually only one target main base station and one target main service cell) completes the target side resource reservation configuration related to the "handover preparation" process, the source cell immediately opens the "handover execution" at the air interface, and the terminal UE immediately executes the handover command to attempt to handover to the target base station cell. Therefore, an "actual handover moment" of the terminal UE and the reception of the air interface handover command are closely continuous in time. The air interface handover command sent by the source cell is usually sent to the UE when the terminal UE and the network side satisfy the "actual handover condition" at the same time. This "actual handover condition" means that the radio signal quality of the designated target base station cell is sufficiently good, the communication resources are reserved sufficiently and the configuration is reasonable, and after the UE successfully switches to the target base station cell, the continuity of at least a part of the traffic may be maintained.

However, a conventional unconditional handover mechanism is originally designed for the deployment of low-frequency non-dense cells. With the expansion of capacity of network evolution, heterogeneous networks are deployed on the homogeneous networks (HetNet), for example, many small cells are deployed in a coverage area of cellular macro-cells. In the 5G system, in addition to using low-frequency resources, high-frequency resources up to 100 GHz will also be used. These high-frequency cells can only be deployed in a form of dense small cells as a small cell cluster. Many cells lead to many choices in a case of performing handover, and the conventional unconditional handover mechanism is no longer applicable. Therefore, the 3GPP introduces the conditional handover mechanism (CHO).

In a CHO process, the two stages of "CHO handover preparation" and "CHO handover execution" are greatly separated in time, that is, a large interval is allowed between the "CHO handover preparation" and the "CHO handover execution". The source cell reports the measurement report and a local RRM strategy based on the radio measurement result of the UE, starts the "CHO handover preparation" process, requests the plurality of potential/candidate target base station cells to complete the target side resource reservation configuration associated with the "CHO handover preparation" process, and sends the CHO pre-configuration information to the UE through the air interface RRC signaling. Subsequently, the source cell does not immediately start the "CHO handover execution", and the terminal UE does not immediately perform the CHO handover operation to a suitable target base station cell, but waits until a later moment when a certain UE locally evaluates that the "actual handover condition" is met, the terminal UE will execute the CHO handover operation on a suitable target base station cell. Therefore, an "actual handover moment" of the terminal UE and the reception of the air interface CHO handover command are discontinuous in time. Through the CHO mechanism, the source cell can reserve and configure a plurality of target side (cell) resources in advance when the radio link condition of the source side is still good (for example, a non-cell edge), and the terminal UE selects the most suitable target cell to execute handover according to the local dynamic condition, thus reducing the handover failure probability and improving the user traffic experience.

Figure 3:
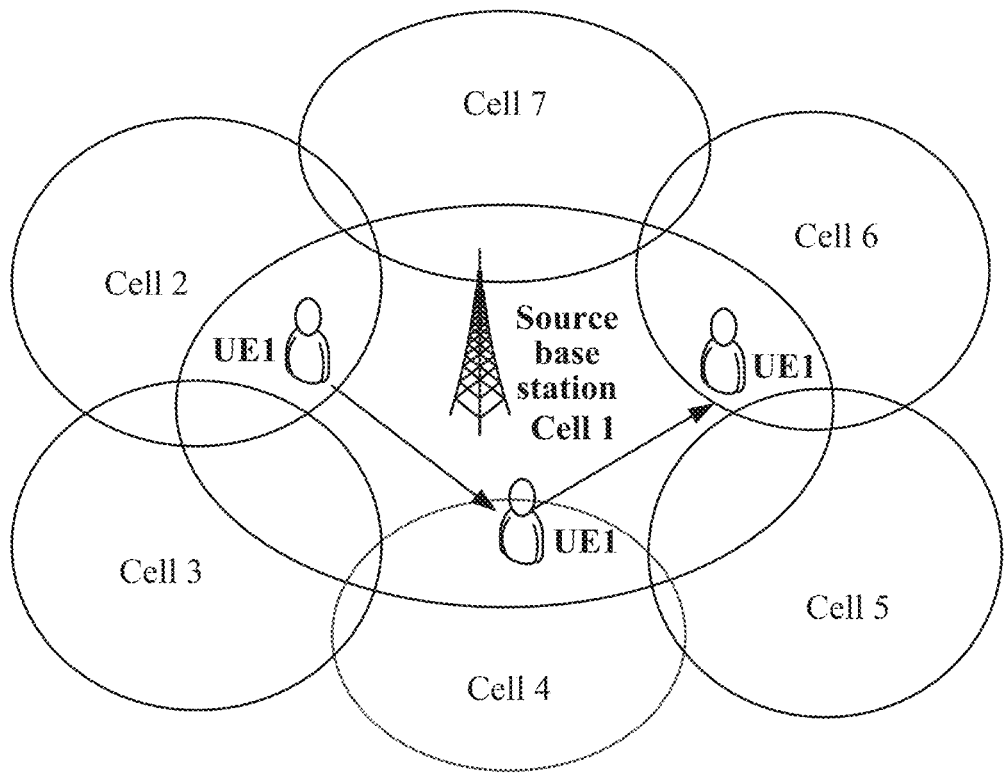
FIG. 3 is a diagram showing a scene of conditional handover according to an embodiment.

FIG. 3 is a diagram showing a scene of conditional handover according to an embodiment. As shown in FIG. 3, a certain source base station has local cells including Cell1/2/3/4/5/6/7, where the Cell1 is a current main service cell of a certain terminal UE1. With the undirected movement of the UE1, neighbor cells including Cell2/3/4/5/6/7 may become potential/candidate target cells of the UE1. Therefore, in order to enhance mobile robustness and improve user experience, the source base station can pre-configure the Cell2/3/4/5/6/7 cells as the potential/candidate target base station cells of the UE through the CHO mechanism.

When the subsequent UE1 locally evaluates that the "actual handover condition" is satisfied in movement, the UE1 executes the CHO handover operation to the target cell satisfying the CHO handover condition. When CHO involves operation across different base stations, the source base station and neighbor base stations need to perform the CHO pre-configuration negotiation and the "CHO handover preparation" based on the interface signaling flow.

Figure 4:
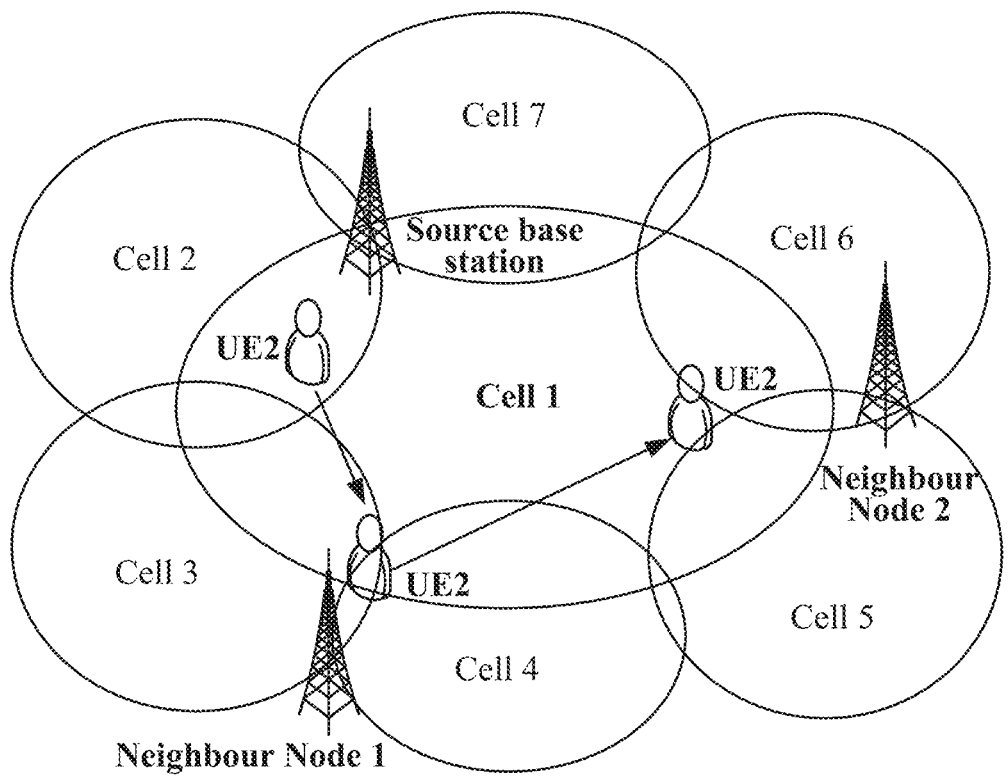
FIG. 4 is a diagram showing a scene of conditional handover according to another embodiment.

FIG. 4 is a diagram showing a scene of conditional handover according to another embodiment. As shown in FIG. 4, a certain source base station has local cells including Cell1/2/7, and a neighbor node1 and neighbor node2 have local cells including Cell5/6 and local cells including Cell5/6, where the Cell1 is a current main service cell of a certain terminal UE2. With the undirected movement of the UE2, cells including Cell2/3/4/5/6/7 may become potential/candidate target cells of the UE2. Therefore, in order to enhance mobile robustness, the source base station can pre-configure the Cell2/3/4/5/6 cells as the potential/candidate target base station cells of the UE through the CHO mechanism and neighbor base station negotiation. For the above-mentioned potential/candidate target base station cells, in addition to a "CHO addition (initial pre-configuration)" operation associated with each potential/candidate target cell, there are also a "CHO modification (re-pre-configuration)" operation and a "CHO release (delete pre-configuration)" operation. The "CHO addition" operation and the "CHO modification" operation are to make the CHO mechanism to work, because the target base station cell must reserve and configure the communication resources for the UE. The "CHO release" (or CHO cancel) operation greatly affects the efficiency of CHO mechanism and the occupation of system resources.

FIG. 5 is a flowchart of a CHO resource processing method according to an embodiment. As shown in FIG. 5, the method provided in this embodiment includes the following.

In S5010, a source base station of a UE sends CHO resource change request indication information to at least one CHO target base station of the UE, where the CHO resource change request indication information is configured for indicating the at least one CHO target base station to change a resource of at least one CHO target cell of the UE.

The CHO resource processing method provided in this embodiment is applied to the source base station providing a service for the UE in a mobile communication system. The source base station refers to the base station that is providing the service for the UE. The UE accesses a mobile communication network through the source base station, the source base station provides one or more cells, the UE accesses the mobile communication network at one moment through a service cell provided by the source base station, and the service cell accessed by the UE is called a main service cell. When the UE is in a mobile state, the UE may leave a coverage range of the main service cell and reach other service cells. In order to ensure the continuity of the communication traffic of the UE, it is necessary to execute a handover flow. Since the handover preparation flow and handover completion flow of the unconditional handover are continuous in time, that is, the handover is executed immediately when it is determined that the resources of the target cell satisfies the handover requirements, and there is no problem of occupying resources. Therefore, in the embodiment of the present application, only the condition of conditional handover (CHO) is discussed, and the handover described below in the embodiment of the present application refers to the conditional handover.

As shown in FIG. 3, when the UE performs the conditional handover among a plurality of service cells provided by one base station, since the plurality of service cells are provided by one base station, and no additional base station needs to pre-configure communication resources for the UE, the conditional handover among the plurality of service cells provided by one base station as shown in FIG. 3 has little influence on the work efficiency and the occupation of system resources. In a scene shown in FIG. 4, when there are a plurality of service cells provided by other base stations near the main service cell accessed by the UE, in order to ensure the continuity of UE communication services, in the CHO mechanism, it is required that the base stations of other service cells that the UE is located near the primary service cell are all transmission resources pre-configured by the UE. In practice, the UE will only move to one service cell and complete the handover, and the transmission resources reserved by other service cells that are not switched to will be occupied for a long time, which will occupy more system resources.

Therefore, the CHO resource processing method provided in this embodiment is aimed at the CHO scene shown in FIG. 4, that is, the potential CHO scene of the UE is carried out in the service cells controlled by a plurality of base stations. The movement track of the UE is continuous, so the UE must switch from the current primary service cell to the neighbor service cell in a case of performing the CHO. However, since the direction to be moved by the UE cannot be accurately determined, the neighbor cells of the primary service cell are all potential/candidate target cells of the UE, and the base station providing the target cell becomes the CHO target base station. The target base station corresponding to each target cell should pre-configure transmission resources for the UE. In practice, since the movement track of UE may be predicted in some conditions, for example, a UE in a uniform movement state will continue to move towards the original movement direction with a high probability, and will move to the direction opposite to the current movement direction with the extremely small probability. Thus, the probability of UE switching to each CHO target cell is different, and the probability of using the transmission resources pre-configured for the CHO target cell with extremely low handover probability is also extremely low. Therefore, it may be considered to release this part of transmission resources in advance. Alternatively, the load in some CHO target cells of the UE is already heavy, if the UE switches to the CHO target cell with severe load again, the communication services of other UEs accessed in the cell will be affected, or the communication services satisfying the requirements will not be provided for the UE to be switched. At this time, the UE can also be prevented from switching to the CHO target cell with severe load, and the transmission resources pre-configured for the UE by such cells will be released in advance. Alternative, in other conditions, when the CHO target cell of the UE is not suitable to be the target cell of the UE, the transmission resources pre-configured by the target cell for the UE may be released or cancelled in advance.

The source base station of the UE may acquire various information and parameters of the UE and acquire relevant information of other base stations through the transmission channel among the base stations, so that the source base station of the UE may know whether the CHO target cell of the UE is suitable for handover. When the source base station of the UE determines that one or more CHO target cells of the UE are no longer suitable to be the CHO target cells of the UE, the source base station of the UE sends CHO resource change request indication information to at least one CHO target base station of the UE. The CHO resource change request indication information is configured for indicating at least one CHO target base station to change a resource of at least one CHO target cell of the UE. One or more CHO target cells determined by the source base station of the UE that are not suitable for being the UE may be respectively provided by one or more CHO target base stations of the UE, and the UE needs to send the CHO resource change request indication information to the CHO target base station corresponding to each determined CHO target cell. The CHO resource change request indication information may be configured for indicating the CHO target base station providing the CHO target cell to release the resource of the CHO target cell, for indicating the CHO target base station providing the CHO target cell to cancel the resources of the CHO target cell, or for indicating the CHO target base station providing the CHO target cell to modify the resource of the CHO target cell. Releasing and canceling the resource of the CHO target cell both means that the CHO target cell is no longer suitable to become the CHO target cell of the UE. In the following embodiments of the present application, releasing the resource of the CHO target cell is only taken as an example for explanation. The processing of canceling the resource of the CHO target cell is the same as that of releasing the resource of the CHO target cell, and the processing flow is similar. The resource of the CHO target cell may be modified by increasing or decreasing the resource of the CHO target cell so as to provide more matched resource for the UE.

In order to distinguish CHO target cells whose resources are required to be changed by the CHO resource change request indication information, the CHO resource change request indication information may include an identifier for distinguishing the CHO target cells, such as a target cell id List, and the target cell id list includes a cell identifier for determining the CHO target cell whose resources need to be changed.

In one embodiment, the source base station of the UE sends the CHO resource change request indication information to the at least one CHO target base station of the UE through interface signaling among base stations. The interface signaling may be an interface signaling of which an Xn interface conforms to XnAP.

In S5020, the source base station sends a CHO resource change notification to the UE, where the CHO resource change notification includes information indicating that the resource of the at least one CHO target cell is changed and an identifier of the at least one CHO target cell.

After the source base station sends the CHO resource change request indication information to at least one CHO target base station of the UE, and the at least one CHO target base station that receives the CHO resource change request indication information will determine to change the resource of at least one CHO target cell indicated by the CHO resource change request indication information. The CHO target base station changes the allocated resource of at least one CHO target cell in response to the CHO resource change request indication information.

The source base station needs to send the CHO resource change notification to the UE, where the CHO resource change notification includes information indicating that the resource of the at least one CHO target cell is changed, so that the UE also knows that the resource of at least one CHO target cell has been changed. After the UE moves the CHO target cell where the resource changes, the UE can select the switched target cell according to the transmission resource of the CHO target cell where the resource changes. For example, the CHO resource change request indication information indicates that a first CHO target cell of a first CHO target base station releases the allocated resource, then the CHO resource change notification sent by the source base station to the UE includes the information indicating that the resource of the first CHO target cell has been released, even if the UE moves to a range of the first CHO target cell, handover measurement evaluation is not performed on the first CHO target cell, so that the resources pre-allocated for the first CHO target cell may be released in advance, and the processing burden of the UE during CHO handover is reduced. if the CHO resource change request indication information indicates that a first CHO target cell of a first CHO target base station modifies and reduces the allocated resources, then the CHO resource change notification sent by the source base station to the UE includes the information indicating that the resource of the first CHO target cell has been modified and reduced. When the UE moves to the range of the first CHO target cell, the handover measurement evaluation is performed on the first CHO target cell and other switchable CHO target cells. Since the resources of the first CHO target cell have been modified and reduced, the UE will not switch to the first CHO target cell with a high probability, so that the CHO handover flow may be optimized, and the destination cell of the UE for CHO handover may be modified according to the resource usage of each cell, thus improving the resource utilization rate of the system and improving the use experience of the user.

According to the CHO resource processing method provided in this embodiment, first, the source base station of the UE sends the CHO resource change request indication information to at least one CHO target base station of the UE, where the CHO resource change request indication information is configured for indicating the at least one CHO target base station to change the resource of at least one CHO target cell of the UE. Then, the source base station sends the CHO resource change notification to the UE, where the CHO resource change notification includes information indicating that the resource of the at least one CHO target cell is changed, so that the system resources may be controlled and utilized, the system resources excessive occupied by pre-allocated resources for all CHO target cells in the CHO handover may be avoided, the resource utilization rate of the system may be improved, the processing burden of the UE may be reduced, and the use experience of the user may be improved.

In one embodiment, the CHO resource change request indication information includes a RRM measurement result associated with the at least one CHO target cell of the UE, where the RRM measurement result associated with the at least one CHO target cell of the UE is configured for causing the at least one CHO target base station to determine whether to change the resource of the at least one CHO target cell and the identifier of the at least one CHO target cell. The RRM measurement result associated with the at least one CHO target cell of the UE may be measured and reported by the UE to the source base station. After the source base station sends the RRM measurement result to at least one CHO target base station, the CHO target base station receiving the RRM measurement result may determine the CHO target cell that the UE may switch or determine the probability that the UE switches to each CHO target cell according to the RRM measurement result of at least one CHO target cell. For example, if the RRM measurement result of the first CHO target cell is poor, it means that the UE is far away from the first CHO target cell, or the network environment is poor, even if the UE switches to the first CHO target cell, there will not be a better network environment. When the target base station to which the first CHO target cell belongs determines that the RRM measurement result of the UE to the first CHO target cell is poor and less than a preset threshold value, the resource of the first CHO target cell may be selected to be released to avoid the UE switching to the first CHO target cell.

In addition, when a decision on whether to change the resource of the CHO target cell is made by the CHO target base station to which the CHO target cell belongs, before the CHO resource change notification is sent to the UE, the source base station also needs to receive a CHO resource change request feedback information sent by at least one CHO target base station. The CHO resource change request feedback information includes whether the resource of at least one CHO target cell is changed and result information after the resource of at least one CHO target cell is changed, and the identifier of at least one CHO target cell. That is, only the CHO target base station receiving the CHO resource change request indication information knows accurately which CHO target cell resource has been changed and the change result. The CHO target base station needs to send the CHO resource change request feedback information to the source base station, so that the source base station can know whether the resource of at least one CHO target cell is changed and the change result. The source base station sends the CHO resource change notification to the UE again. The CHO resource change request indication information sent by the source base station may be required to be enforced, so the CHO target base station does not need to send the CHO resource change request feedback information, that is, if the CHO resource change request indication information is mandatory, the source base station does not receive the CHO resource change request feedback information sent by at least one CHO target base station. The CHO resource change request indication information indicating that needs feedback may be carried and sent by class 1 flow. The CHO resource change request indication information indicating that does not need feedback may be carried and sent by class 2 flow.

In one embodiment, the CHO resource change request indication information includes an expected probability factor associated with the at least one CHO target cell of the UE, and the expected probability factor is configured for representing a degree to which the source base station expects the at least one CHO target cell to change a resource. The expected probability factor associated with at least one CHO target cell of the UE is determined by the source base station according to a location of the UE or at least one piece of measurement information fed back by the UE. For example, the source base station may determine the location and movement track of the UE according to various pieces of measurement information fed back by the UE, thereby predicting the probability of the UE switching to each CHO target cell. Then, the expected probability factor associated with each CHO target cell is determined according to the predicted probability of the UE switching to each CHO target cell. Alternatively, the source base station may also determine a distance between the UE and each CHO target cell or the network quality after the UE is switched to each CHO target cell according to various pieces of measurement information fed back by the UE, and thereby determining the expected probability factor associated with each CHO target cell. After the CHO resource change request indication information is received, the CHO target base station determines whether to change the resource of each CHO target cell according to the expected probability factor associated with each CHO target cell. For example, the lower the expected probability factor, the lower the probability of UE handover. If the expected probability factor is lower than a certain threshold value, the resources of CHO target cells with the expected probability factor lower than a certain threshold value may be released. When the expected probability factor is 100%, the expectation is the highest, and when the expected probability factor is 1%, the expectation is the lowest.

FIG. 6 is a flowchart of another CHO resource processing method according to an embodiment. As shown in FIG. 6, the method provided in this embodiment includes the following.

In S6010, a CHO target base station of a UE receives CHO resource change request indication information sent by a source base station of the UE, where the CHO resource change request indication information is configured for indicating the at least one CHO target base station to change a resource of at least one CHO target cell of the UE.

The CHO resource processing method provided in this embodiment is applied to the CHO target base station where the UE performs conditional handover in a mobile communication system. The source base station refers to the base station that is providing the service for the UE. The UE accesses a mobile communication network through the source base station, the source base station provides one or more cells, the UE accesses the mobile communication network at one moment through a service cell provided by the source base station, and the service cell accessed by the UE is called a primary service cell. When the UE is in a mobile state, the UE may leave a coverage range of the main service cell and reach other service cells. In order to ensure the continuity of the communication traffic of the UE, it is necessary to execute a handover flow. Because the handover preparation flow and handover completion flow of the unconditional handover are continuous in time, that is, the handover is executed immediately when it is determined that the resources of the target cell satisfies the handover requirements, and there is no problem of occupying resources. Therefore, in the embodiment of the present application, only the condition of conditional handover (CHO) is discussed, and the handover described below in the embodiment of the present application refers to the conditional handover.

As shown in FIG. 3, when the UE performs the conditional handover among a plurality of service cells provided by one base station, since the plurality of service cells are provided by one base station, and no additional base station needs to pre-configure communication resources for the UE, the conditional handover among the plurality of service cells provided by one base station as shown in FIG. 3 has little influence on the work efficiency and the occupation of system resources. In a scene shown in FIG. 4, when there are a plurality of service cells provided by other base stations near the primary service cell accessed by the UE, in order to ensure the continuity of UE communication services, in the CHO mechanism, it is required that the base stations of other service cells that the UE is located near the primary service cell are all transmission resources pre-configured by the UE. In practice, the UE will only move to one service cell and complete the handover, and the transmission resources reserved by other service cells that are not switched to will be occupied for a long time, which will occupy more system resources.

Therefore, the CHO resource processing method provided in this embodiment is aimed at the CHO scene shown in FIG. 4, that is, the potential CHO scene of the UE is carried out in the service cells controlled by a plurality of base stations. The movement track of the UE is continuous, so the UE must switch from the current primary service cell to the neighbor service cell in a case of performing the CHO. However, since the direction to be moved by the UE cannot be accurately determined, the neighbor cells of the primary service cell are all potential/candidate target cells of the UE, and the base station providing the target cell becomes the CHO target base station. The target base station corresponding to each target cell should pre-configure transmission resources for the UE. In practice, since the movement track of UE may be predicted in some conditions, for example, a UE in a uniform movement state will continue to move towards the original movement direction with a high probability, and will move to the direction opposite to the current movement direction with the extremely small probability. Thus, the probability of UE switching to each CHO target cell is different, and the probability of using the transmission resources pre-configured for the CHO target cell with extremely low handover probability is also extremely low. Therefore, it may be considered to release this part of transmission resources in advance. Alternatively, the load in some CHO target cells of the UE is already heavy, if the UE switches to the CHO target cell with severe load again, the communication services of other UEs accessed in the cell will be affected, or the communication services satisfying the requirements will not be provided for the UE to be switched. At this time, the UE can also be prevented from switching to the CHO target cell with severe load, and the transmission resources pre-configured for the UE by such cells will be released in advance. Alternatively, in other conditions, when the CHO target cell of the UE is not suitable to be the target cell of the UE, the transmission resources pre-configured by the target cell for the UE may be released or cancelled in advance.

The source base station of the UE may acquire various information and parameters of the UE and acquire relevant information of other base stations through the transmission channel among the base stations, so that the source base station of the UE can know whether the CHO target cell of the UE is suitable for handover. When the source base station of the UE determines that one or more CHO target cells of the UE are no longer suitable to be the CHO target cells of the UE, the CHO target base station of the UE will receive the CHO resource change request indication information sent by the source base station of the UE. The CHO resource change request indication information is configured for indicating at least one CHO target base station to change the resource of at least one CHO target cell of the UE. One or more CHO target cells determined by the source base station of the UE that are not suitable for being the UE may be respectively provided by one or more CHO target base stations of the UE, and the UE needs to send the CHO resource change request indication information to the CHO target base station corresponding to each determined CHO target cell. The CHO resource change request indication information may be configured for indicating the CHO target base station providing the CHO target cell to release the resource of the CHO target cell, for indicating the CHO target base station providing the CHO target cell to cancel the resources of the CHO target cell, or for indicating the CHO target base station providing the CHO target cell to modify the resource of the CHO target cell. Releasing and canceling the resource of the CHO target cell both means that the CHO target cell is no longer suitable to become the CHO target cell of the UE. In the following embodiments of the present application, releasing the resource of the CHO target cell is only taken as an example for explanation. The processing of canceling the resource of the CHO target cell is the same as that of releasing the resource of the CHO target cell, and the processing flow is similar. The resource of the CHO target cell may be modified by increasing or decreasing the resource of the CHO target cell so as to provide more matched resource for the UE.

In order to distinguish CHO target cells whose resources are required to be changed by the CHO resource change request indication information, the CHO resource change request indication information may include an identifier for distinguishing the CHO target cells, such as a target cell id List, and the target cell id list includes a cell identifier for determining the CHO target cell whose resources need to be changed.

In one embodiment, the CHO target base station of the UE receives the CHO resource change request indication information sent by the source base station of the UE through interface signaling among base stations. The interface signaling may be an interface signaling of which an Xn interface conforms to XnAP.

In S6020, the CHO target base station changes the resource of the at least one CHO target cell indicated by the CHO resource change request indication information.

After the CHO resource change request indication information is received, the CHO target base station may directly determine to change the resource of at least one CHO target cell indicated by the CHO resource change request indication information according to an indication of the CHO resource change request indication information. The CHO target base station changes the allocated resource of at least one CHO target cell in response to the CHO resource change request indication information.

When the CHO target base station changes the allocated resource of at least one CHO target cell, after the UE moves the CHO target cell where the resource changes, the UE can select the switched target cell according to the transmission resource of the CHO target cell where the resource changes. For example, the CHO resource change request indication information indicates that a first CHO target cell of a first CHO target base station releases the allocated resource, even if the UE moves to a range of the first CHO target cell, handover measurement evaluation is not performed on the first CHO target cell, so that the resources pre-allocated for the first CHO target cell may be released in advance, and the processing burden of the UE during CHO handover is reduced. If the CHO resource change request indication information indicates that a first CHO target cell of a first CHO target base station modifies and reduces the allocated resources, then when the UE moves to the range of the first CHO target cell, the handover measurement evaluation is performed on the first CHO target cell and other switchable CHO target cells. Since the resources of the first CHO target cell have been modified and reduced, the UE will not switch to the first CHO target cell with a high probability, so that the CHO handover flow may be optimized, and the destination cell of the UE for CHO handover may be modified according to the resource usage of each cell, thus improving the resource utilization rate of the system and improving the use experience of the user.

According to the CHO resource processing method provided in this embodiment, at first, the CHO target base station of the UE receives the CHO resource change request indication information sent by the source base station of the UE, where the CHO resource change request indication information is configured for indicating the at least one CHO target base station to change the resource of at least one CHO target cell of the UE. Then, the CHO target base station changes the resource of at least one CHO target cell indicated by the CHO resource change request indication information, so that the system resources may be controlled and utilized, the system resources excessive occupied by pre-allocated resources for all CHO target cells in the CHO handover may be avoided, the resource utilization rate of the system may be improved, the processing burden of the UE may be reduced, and the use experience of the user may be improved.

In one embodiment, the CHO resource change request indication information includes a measurement result associated with the at least one CHO target cell of the UE and an identifier of the at least one target cell. The CHO target base station changes the resource of the at least one target cell indicated by a resource change request indication information indicating that includes determining, by the CHO target base station, whether to change the resource of the at least one CHO target cell indicated by a resource release/cancel request indication information according to the RRM measurement result associated with the at least one CHO target cell of the UE. The RRM measurement result associated with the at least one CHO target cell of the UE may be measured and reported by the UE to the source base station. After the source base station sends the CHO resource change request indication information including the RRM measurement result to at least one CHO target base station, the CHO target base station receiving the RRM measurement result may determine the CHO target cell that the UE may switch or determine the probability that the UE switches to each CHO target cell according to the RRM measurement result of at least one CHO target cell. For example, if the RRM measurement result of the first CHO target cell is poor, it means that the UE is far away from the first CHO target cell, or the network environment is poor, even if the UE switches to the first CHO target cell, there will not be a better network environment. When the target base station to which the first CHO target cell belongs determines that the RRM measurement result of the UE to the first CHO target cell is poor and less than a preset threshold value, the resource of the first CHO target cell may be selected to be released to avoid the UE switching to the first CHO target cell.

In addition, when a decision on whether to change the resource of the CHO target cell is made by the CHO target base station to which the CHO target cell belongs, after the CHO target base station of the UE receives the CHO resource change request indication information sent by the source base station of the UE, the CHO target base station also needs to send a CHO resource change request feedback information to the source base station. The CHO resource change request feedback information includes whether the resource of at least one CHO target cell is changed and result information after the resource of at least one CHO target cell is changed, and the identifier of at least one CHO target cell. That is, only the CHO target base station receiving the CHO resource change request indication information knows accurately which CHO target cell resource has been changed and the change result. The CHO target base station needs to send the CHO resource change request feedback information to the source base station, so that the source base station can know whether the resource of at least one CHO target cell is changed and the change result. The source base station sends the CHO resource change notification to the UE again. The CHO resource change request indication information received by the CHO target base station may also be required to be enforced, so the CHO target base station does not need to send the CHO resource change request feedback information. That is, if the CHO resource change request indication information is mandatory, the CHO target base station does not send the CHO resource change request feedback information to the source base station. The CHO resource change request indication information indicating that needs feedback may be carried and sent by class 1 flow. The CHO resource change request indication information indicating that does not need feedback may be carried and sent by class 2 flow.

In one embodiment, the CHO resource change request indication information includes an expected probability factor associated with the at least one CHO target cell of the UE, and the expected probability factor is configured for representing a degree to which the source base station expects the at least one CHO target cell to change a resource. The expected probability factor associated with at least one CHO target cell of the UE is determined by the source base station according to a location of the UE or at least one piece of measurement information fed back by the UE. For example, the source base station may determine the location and movement track of the UE according to various pieces of measurement information fed back by the UE, thereby predicting the probability of the UE switching to each CHO target cell. Then, the expected probability factor associated with each CHO target cell is determined according to the predicted probability of the UE switching to each CHO target cell. Alternatively, the source base station may also determine a distance between the UE and each CHO target cell or the network quality after the UE is switched to each CHO target cell according to various pieces of measurement information fed back by the UE, and thereby determining the expected probability factor associated with each CHO target cell may be determined according to the determined distance or the determined network quality. After the CHO resource change request indication information is received, the CHO target base station determines whether to change the resource of each CHO target cell according to the expected probability factor associated with each CHO target cell. For example, the lower the expected probability factor, the lower the probability of UE handover. If the expected probability factor is lower than a certain threshold value, the resources of CHO target cells with the expected probability factor lower than a certain threshold value may be released. When the expected probability factor is 100%, the expectation is the highest, and when the expected probability factor is 1%, the expectation is the lowest.

FIG. 7 is a flowchart of another CHO resource processing method according to an embodiment. As shown in FIG. 7, the method provided in this embodiment includes the following.

In S7010, a source base station of a UE receives CHO resource change notification indication information sent by a CHO target base station of the UE through actively triggering, where the CHO resource change notification indication information is configured for notifying the source base station that the CHO target base station has determined to change a resource of at least one CHO target cell of the UE.

The CHO resource processing method provided in this embodiment is applied to the source base station providing a service for the UE in a mobile communication system. The source base station refers to the base station that is providing the service for the UE. The UE accesses a mobile communication network through the source base station, the source base station provides one or more cells, the UE accesses the mobile communication network at one moment through a service cell provided by the source base station, and the service cell accessed by the UE is called a primary service cell. When the UE is in a mobile state, the UE may leave a coverage range of the main service cell and reach other service cells. In order to ensure the continuity of the communication traffic of the UE, it is necessary to execute a handover flow. Because the handover preparation flow and handover completion flow of the unconditional handover are continuous in time, that is, the handover is executed immediately when it is determined that the resources of the target cell satisfies the handover requirements, and there is no problem of occupying resources. Therefore, in the embodiment of the present application, only the condition of conditional handover (CHO) is discussed, and the handover described below in the embodiment of the present application refers to the conditional handover.

As shown in FIG. 3, when the UE performs the conditional handover among a plurality of service cells provided by one base station, since the plurality of service cells are provided by one base station, and no additional base station needs to pre-configure communication resources for the UE, the conditional handover among the plurality of service cells provided by one base station as shown in FIG. 3 has little influence on the work efficiency and the occupation of system resources. In a scene shown in FIG. 4, when there are a plurality of service cells provided by other base stations near the primary service cell accessed by the UE, in order to ensure the continuity of UE communication services, in the CHO mechanism, it is required that the base stations of other service cells that the UE is located near the primary service cell are all transmission resources pre-configured by the UE. In practice, the UE will only move to one service cell and complete the handover, and the transmission resources reserved by other service cells that are not switched to will be occupied for a long time, which will occupy more system resources.

Therefore, the CHO resource processing method provided in this embodiment is aimed at the CHO scene shown in FIG. 4, that is, the potential CHO scene of the UE is carried out in the service cells controlled by a plurality of base stations. In the CHO resource processing method provided in the embodiments shown in FIGS. 5 and 6, the source base station triggers to change the resource of at least one CHO target cell. In this embodiment, the CHO target base station triggers to change the resource of at least one CHO target cell. The source base station of the UE will receive the CHO resource change notification indication information sent by the CHO target base station of the UE, where the CHO resource change notification indication information is configured for notifying the source base station that the CHO target base station has determined to change the resource of at least one CHO target cell of the UE. The CHO target base station determines that it is necessary to change the resource of at least one CHO target cell controlled by the CHO target base station according to the resource usage of the CHO target base station or other possible factors. For example, when the first CHO target base station determines that the load of the first CHO target cell controlled by the first CHO target base station is too large, so the first CHO target base station does not want the first CHO target cell to be called the CHO target cell of the UE again, then the first CHO target base station determines to release the resource of the first CHO target cell.

In order to enable the UE to know that the target base station has determined to change the resource of at least one CHO target cell of the UE, the source base station needs to receive the CHO resource change notification indication information sent by the CHO target base station, thereby avoiding the access flow in the CHO target cell where the resource has been released, or using the changed resource to access the CHO target cell.

The CHO resource change notification indication information may be configured for notifying the source base station that the CHO target base station providing the CHO target cell releases the resource of the CHO target cell, for notifying the source base station that the CHO target base station providing the CHO target cell cancels the resource of the CHO target cell, or for notifying the source base station that the CHO target base station providing the CHO target cell modifies the resource of the CHO target cell. Releasing and canceling the resource of the CHO target cell both means that the CHO target cell is no longer suitable to become the CHO target cell of the UE. In the following embodiments of the present application, releasing the resource of the CHO target cell is only taken as an example for explanation. The processing of canceling the resource of the CHO target cell is the same as that of releasing the resource of the CHO target cell, and the processing flow is similar. The resource of the CHO target cell may be modified by increasing or decreasing the resource of the CHO target cell so as to provide more matched resource for the UE.

In order to distinguish CHO target cells whose resources are required to be changed by the CHO resource change notification indication information, the CHO resource change notification indication information may include an identifier for distinguishing the CHO target cells, such as a target cell id List, and the target cell id list includes a cell identifier for determining the CHO target cell whose resources need to be changed.

In one embodiment, the source base station of the UE receives the CHO resource change notification indication information sent by the CHO target base station of the UE through interface signaling among base stations. The interface signaling may be an interface signaling of which an Xn interface conforms to XnAP.

In S7020, the source base station sends a CHO resource change notification to the UE, where the CHO resource change notification includes information indicating that the resource of the at least one CHO target cell is changed and an identifier of the at least one CHO target cell.

After the source base station receives the CHO resource change notification indication information sent by the CHO target base station of the UE, the source base station also needs to send the CHO resource change notification to the UE. The CHO resource change notification includes the information indicating that the resource of at least one CHO target cell is changed, so that the UE also knows that the resource of at least one CHO target cell has been changed. After the UE moves the CHO target cell where the resource changes, the UE can select the switched target cell according to the transmission resource of the CHO target cell where the resource changes. For example, the CHO resource change notification indication information notifies the source base station that the first CHO target cell of the first CHO target base station releases the allocated resource, then the CHO resource change notification sent by the source base station to the UE includes the information indicating that the resource of the first CHO target cell has been released, even if the UE moves to a range of the first CHO target cell, handover measurement evaluation is not performed on the first CHO target cell, so that the resources pre-allocated for the first CHO target cell may be released in advance, and the processing burden of the UE during CHO handover is reduced. If the CHO resource change notification indication information notifies that the first CHO target cell of the first CHO target base station modifies and reduces the allocated resources, then the CHO resource change notification sent by the source base station to the UE includes the information indicating that the resource of the first CHO target cell has been modified and reduced. When the UE moves to the range of the first CHO target cell, the handover measurement evaluation is performed on the first CHO target cell and other switchable CHO target cells. Since the resources of the first CHO target cell have been modified and reduced, the UE will not switch to the first CHO target cell with a high probability, so that the CHO handover flow may be optimized, and the destination cell of the UE for CHO handover may be modified according to the resource usage of each cell, thus improving the resource utilization rate of the system and improving the use experience of the user.

According to the CHO resource processing method provided in this embodiment, first, the source base station of the UE receives the CHO resource change notification indication information to the CHO target base station of the UE, where the CHO resource change notification indication information is configured for notifying the source base station that the CHO target base station has determined to change the resource of at least one CHO target cell of the UE; and then the source base station sends the CHO resource change notification to the UE, where the CHO resource change notification includes information indicating that the resource of the at least one CHO target cell is changed, so that the system resources may be controlled and utilized, the system resources excessive occupied by pre-allocated resources for all CHO target cells in the CHO handover may be avoided, the resource utilization rate of the system may be improved, the processing burden of the UE may be reduced, and the use experience of the user may be improved. In one embodiment, the CHO resource change notification indication information includes a reason for changing the resource of at least one CHO target cell and an identifier of at least one CHO target cell. The reason for changing the resource of at least one CHO target cell include, for example, overload or failure or the like. After the CHO resource change notification indication information is received, the source base station will know the reason for changing the resource of at least one CHO target cell, thus assisting the source base station to perform a reference.

In addition, after the source base station of the UE receives the CHO resource change notification indication information sent by the CHO target base station of the UE, the source base station can also send the CHO resource change notification feedback information to the CHO target base station. The CHO resource change notification feedback information includes the information indicating that the source base station determines that the resource of the at least one CHO target cell is changed. That is, after the CHO resource change notification indication information is received, the source base station can notify the CHO target base station that the source base station has learned the information indicating that the resource of at least one CHO target cell is changed, and at this time, the CHO target base station can complete the change of the resource of at least one CHO target cell. If the CHO target base station changes the resource of at least one CHO target cell without receiving the CHO resource change notification feedback information sent by the source base station, the UE may not know that the resource of at least one CHO target cell is changed, and the UE still accesses the CHO target cell whose resources have been changed, resulting in access failure. The CHO resource change notification indication information sent by the CHO target base station may also need to be enforced, so the source base station may not send the CHO resource change notification feedback information. The CHO resource change notification indication information indicating that needs feedback may be carried and sent by class 1 flow. The CHO resource change notification indication information indicating that does not need feedback may be carried and sent by class 2 flow.

In one embodiment, the CHO resource change notification indication information includes a pre-configured expected probability factor associated with the at least one CHO target cell of the UE, and the pre-configured expected probability factor is configured for representing a degree to which the at least one target base station expects resources to be pre-configured by CHO again. The pre-configured expected probability factor associated with the at least one CHO target cell is determined by the CHO target base station according to a state of the at least one CHO target cell. After the resource of at least one CHO target cell is changed, when the state of at least one CHO target cell returns to normal, the CHO target base station can re-serve the CHO target cell expected to return to normal as the normal CHO target cell of the UE. The pre-configured expected probability factor represents the degree to which at least one CHO target cell expects to be pre-configured by CHO again. The higher the pre-configured expected probability factor, the higher the degree to which at least one CHO target cell expects to be pre-configured by CHO again, and vice versa. When the pre-configured expected probability factor is 100%, the expectation is the highest, and when the pre-configured expected probability factor is 1%, the expectation is the lowest.

In one embodiment, before the source base station of the UE receives the CHO resource change notification indication information sent by the CHO target base station of the UE, the method further includes that the source base station sends a CHO resource change license indication information to the CHO target base station. The CHO resource change license indication information is configured for licensing the CHO target base station actively triggering to change the resource of the at least one CHO target cell. Since the UE is currently accessing the source cell, the processing of the transmission resources used by the UE should have been triggered by the source base station, but in the embodiment shown in FIG. 7, the CHO target base station of the UE triggers to change the resource of at least one CHO target cell of the UE, which may cause conflicts between the source base station and the CHO target base station. Therefore, the source base station can first send the CHO resource change license indication information to the CHO target base station, and then the CHO target base station can actively trigger to change the resource of the CHO target cell and send the CHO resource change notification indication information to the source base station.

FIG. 8 is a flowchart of another CHO resource processing method according to an embodiment. As shown in FIG. 8, the method provided in this embodiment includes the following.

In S8010, a CHO target base station of a UE determines to change a resource of at least one CHO target cell configured by the UE.

In S8020, the CHO target base station triggers and sends CHO resource change notification indication information, where the CHO resource change notification indication information is configured for notifying the source base station that the CHO target base station has determined to change a resource of at least one CHO target cell of the UE.

The CHO resource processing method provided in this embodiment is applied to the CHO target base station where the UE performs conditional handover in a mobile communication system. The CHO resource processing method provided in the embodiment is a processing flow on the side of the CHO target base station in the embodiment shown in FIG. 7. The implementation principle and effects of the CHO resource processing method provided in the embodiment are similar and are not repeated here. The resource processing method performed by the CHO target base station as the executive body is also described in the embodiment shown in FIG. 6, so those skilled in the art can know the specific implementation process of the embodiment in combination with the embodiments shown in FIGS. 7 and 6, and will not be described here.

In one embodiment, based on the embodiment shown in FIG. 8, the CHO resource change notification indication information includes a reason for changing the resource of at least one CHO target cell and an identifier of at least one CHO target cell.

In one embodiment, based on the embodiment shown in FIG. 8, the CHO resource change notification indication information includes a pre-configured expected probability factor associated with the at least one CHO target cell of the UE, and the pre-configured expected probability factor is configured for representing a degree to which the at least one target base station expects resources to be pre-configured by CHO again.

In one embodiment, based on the embodiment shown in FIG. 8, after the CHO target base station sends the CHO resource change notification indication information to the source base station of the UE, the method further includes the following.

The CHO target base station receives CHO resource change notification feedback information sent by the source base station, wherein the CHO resource change notification feedback information includes result information indicating that the source base station determines that the resource of the at least one CHO target cell is changed.

In one embodiment, based on the embodiment shown in FIG. 8, before the CHO target base station sends the CHO resource change notification indication information to the source base station of the UE, the method further includes that the CHO target base station receives the CHO resource change license indication information sent by the source base station. The CHO resource change license indication information is configured for licensing the CHO target base station to actively trigger to change the resource of the at least one CHO target cell.

In one embodiment, based on the embodiment shown in FIG. 8, sending, by the CHO target base station, the CHO resource change notification indication information to the source base station of the UE includes that the CHO target base station sends the CHO resource change notification indication information to the source base station of the UE through the interface signaling among the base stations.

In one embodiment, based on the embodiment shown in FIG. 8, the CHO resource change notification indication information includes at least one of CHO resource release notification indication information, CHO resource cancel notification indication information or CHO resource modification notification indication information.

The CHO resource processing method provided in the embodiments of the present application will be described below in detail through several embodiments.

In one embodiment, a UE is already in CHO operation, and two target cells: Cell3 and Cell4 have been pre-configured for the UE CHO in a target node (gNB or ng-eNB). As the UE moves away from the Cell4, it is unlikely to become the target cell of the UE again, so the source node (gNB or ng-eNB) decides to release/cancel the Cell4 (reducing the CHO evaluation burden of the UE and the inaction reserved occupation of the CHO resource). In S1: the source node sends an XnAP: a handover cancel message, which includes indication information to request the target node to release/cancel the Cell4. In S2: the target node always obeys the release/cancel request, thus releasing/canceling the CHO pre-configured resources associated with Cell4. In S3: the source node notifies the UE through an air interface RRC reconfiguration flow message: the Cell4 has been released/canceled, and no CHO evaluation or handover attempt is required for the Cell4. In one embodiment, a UE is already in CHO operation, and three target cells: Cell3, Cell4 and Cell5 have been pre-configured for the UE CHO in a target node (gNB or ng-eNB). As the UE moves away from the Cell3 and the Cell4, which are unlikely to become the target cells of the UE again, so the source node (gNB or ng-eNB) decides to release/cancel the Cell3 and the Cell4 (reducing the CHO evaluation burden of the UE and the inaction reserved occupation of the CHO resource). In S1: the source node sends an XnAP: a handover request message, which includes indication information to request the target node to release/cancel the Cell3 and the Cell4, and the latest current RRM measurement results for each of the Cell3 and the Cell4. In S2: the target node decides to reserve the Cell3 and but immediately release/cancel the Cell4 according to the latest RRM measurement results of the Cell3 and the Cell4, thus only releasing/canceling the CHO pre-configured resources associated with the Cell4. In S3: the target node needs to reply to the XnAP: a handover request feedback message to the source node, which includes the latest CHO pre-configured information of the Cell 3 and the result information of successful releasing/canceling the Cell 4. In S4: the source node notifies the UE through an air interface RRC reconfiguration flow message in which the Cell3 is not released/cancelled but the CHO pre-configuration is updated; and the Cell 4 has been released/canceled and no CHO evaluation or handover attempt is required for the Cell4.

In one embodiment, a UE is already in CHO operation, and three target cells: Cell3, Cell4 and Cell5 have been pre-configured for the UE CHO in a target node (gNB or ng-eNB). As the UE moves away from the Cell4, it is unlikely to become the target cell of the UE again, so the source node (gNB or ng-eNB) decides to release/cancel the Cell4 (reducing the CHO evaluation burden of the UE and the inaction reserved occupation of the CHO resource). In S1: the source node sends an XnAP: a handover request message, which includes indication information to request the target node to release/cancel the Cell4, and the expected probability factor with 50% associated with the Cell4. In S2: the target node decides to reserve the Cell4 but re-configure the CHO pre-configured resources associated with Cell 4 according to the released/cancelled expected probability factor with 50% sent by the source node. In S3: the target node needs to reply to the XnAP: a handover request feedback message to the source node, which includes the latest CHO pre-configured information of the Cell4. In S4: the source node notifies the UE through an air interface RRC reconfiguration flow message in which the Cell4 has not been released/canceled but the CHO pre-configuration of the Cell4 has been updated.

In one embodiment, a UE is already in CHO operation, and four target cells: Cell2, Cell3, Cell4 and Cell5 have been pre-configured for the UE CHO in a target node (gNB or ng-eNB). As the UE moves away from the Cell3/4/5, which are unlikely to become the target cells of the UE again, so the source node (gNB or ng-eNB) decides to release/cancel the Cell3/4/5 (reducing the CHO evaluation burden of the UE and the inaction reserved occupation of the CHO resource). In S1: the source node sends an XnAP: a handover cancel message, which includes indication information to request the target node to simultaneously release/cancel the Cell3/4/5. In S2: the target node always obeys the release/cancel request, thus releasing/canceling the CHO pre-configured resources associated with Cell3/4/5. In S3: the source node notifies the UE through an air interface RRC reconfiguration flow message: the Cell3/4/5 has been released/canceled, and no CHO evaluation or handover attempt is required for the Cell3/4/5.

In one embodiment, a UE is already in CHO operation, and four target cells: Cell2, Cell3, Cell4 and Cell5 have been pre-configured for the UE CHO in a target node (gNB or ng-eNB). As the local load of Cell4/5 increases, the target base station does not want Cell4/5 to become the target cells of UE again, so the target node (gNB or ng-eNB) decides to release/cancel Cell4/5 actively (reducing the CHO evaluation burden of UE and the inaction reserved occupation of the CHO resource). In S1: the target node sends an XnAP: a handover cancel message, which includes indication information indicating that the target base station actively releases/cancels Cell4/5 at the same time. In S2: the source node always obeys the release/cancel indication, therefore, the target base station releases/cancels actively the CHO pre-configured resources associated with Cell4/5. In S3: the source node notifies the UE through an air interface RRC reconfiguration flow message: the Cell4/5 has been released/canceled, and no CHO evaluation or handover attempt is required for the Cell4/5.

In one embodiment, a UE is already in CHO operation, and three target cells: Cell2, Cell3 and Cell4 have been pre-configured for the UE CHO in a target node (gNB or ng-eNB). With the change of the local load of Cell3/4 cells or other RRM strategy, the target base station wants to change the CHO pre-configuration information associated with the Cell3, and does not want the Cell4 to become the target cell of UE again, so the target node (gNB or ng-eNB) decides to actively modify the Cell3 and release/cancel the Cell4 (reducing the CHO evaluation burden of UE and the inaction reserved occupation of the CHO resource). In S1: the target node sends an XnAP: a CHO modification required message, which includes the latest CHO pre-configuration information associated with the Cell3 and actively modified by the target base station, and at the same time releases/cancels the indication information of the Cell4. In S2: the source node always obeys the indication of modification and release/cancel of the target cell, therefore, the target base station modifies actively the CHO pre-configured information associated with the Cell3 and simultaneously releases/cancels the CHO pre-configured resources associated with the Cell4. In S3, the source node replies to the target node by sending an XnAP: a CHO modification confirm message to confirm the modification operation and release/cancel operation of the target cell. In S4: the source node notifies the UE through an air interface RRC reconfiguration flow message: the modified CHO pre-configured information associated with the Cell3, the Cell4 has been released/canceled, and no CHO evaluation or handover attempt is required for the Cell4.

In one embodiment, a UE is already in CHO operation, and three target cells: Cell2, Cell3 and Cell4 have been pre-configured for the UE CHO in a target node (gNB or ng-eNB). In S1: the source node sends an XnAP: a handover request message, which includes "whether to allow the target base station to initiate a CHO resource release/cancel switch enable indication"="forbidden", indicating that subsequent target base stations are not allowed to initiate the CHO resource release/cancel actively. In S2: the target node replies to the XnAP: a handover request feedback message, always obeys the above indications, so the target node does not actively initiate the CHO resource release/cancel associated with the target cells: Cell2, Cell3 and Cell4.

FIG. 9 is a structural diagram of a CHO resource processing apparatus according to an embodiment. As shown in FIG. 9, the CHO resource processing apparatus provided in this embodiment includes a first sending module 91 and a second sending module 92.

The first sending module 91 is configured to send CHO resource change request indication information to at least one CHO target base station of a UE, wherein the CHO resource change request indication information is configured for indicating the at least one CHO target base station to change a resource of at least one CHO target cell of the UE. The second sending module 92 is configured to send a CHO resource change notification to the UE, where the CHO resource change notification includes information indicating that the resource of the at least one CHO target cell is changed and an identifier of the at least one CHO target cell.

The CHO resource processing apparatus provided in this embodiment is configured for implementing the CHO resource processing method of the embodiment shown in FIG. 5. The implementation principles and technical effects of the CHO resource processing apparatus provided in this embodiment are similar and are not repeated herein.

Figure 10:
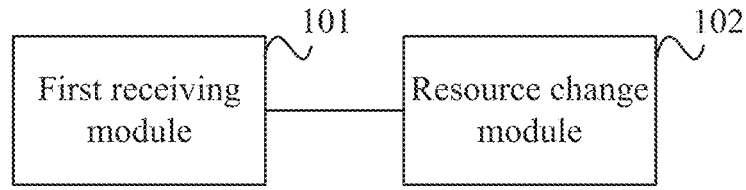
FIG. 10 is a structural diagram of another CHO resource processing apparatus according to an embodiment.

FIG. 10 is a structural diagram of another CHO resource processing apparatus according to an embodiment. As shown in FIG. 10, the CHO resource processing apparatus provided in this embodiment includes a first receiving module 101 and a resource change module 102.

The first receiving module 101 is configured to receive CHO resource change request indication information sent by a source base station of a user equipment (UE), wherein the CHO resource change request indication information is configured for indicating the at least one CHO target base station to change a resource of at least one CHO target cell of the UE. The resource change module 102 is configured to change the resource of the at least one CHO target cell indicated by the CHO resource change request indication information.

The CHO resource processing apparatus provided in this embodiment is configured for implementing the CHO resource processing method of the embodiment shown in FIG. 6. The implementation principles and technical effects of the CHO resource processing apparatus provided in this embodiment are similar and are not repeated herein.

Figure 11:
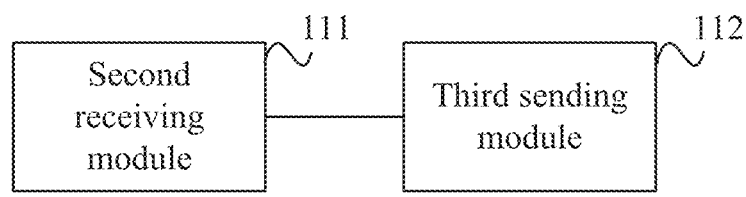
FIG. 11 is a structural diagram of another CHO resource processing apparatus according to an embodiment.

FIG. 11 is a structural diagram of another CHO resource processing apparatus according to an embodiment. As shown in FIG. 11, the CHO resource processing apparatus provided in this embodiment includes a second receiving module 111 and a third sending module 112.

The second receiving module 111 is configured to receive CHO resource change notification indication information sent by a CHO target base station of a UE, where the CHO resource change notification indication information is configured for notifying the source base station that the CHO target base station has determined to change a resource of at least one CHO target cell of the UE. The third sending module 112 is configured to send a CHO resource change notification to the UE, where the CHO resource change notification includes information indicating that the resource of the at least one CHO target cell is changed and an identifier of the at least one CHO target cell.

The CHO resource processing apparatus provided in this embodiment is configured for implementing the CHO resource processing method of the embodiment shown in FIG. 7. The implementation principles and technical effects of the CHO resource processing apparatus provided in this embodiment are similar and are not repeated herein.

Figure 12:
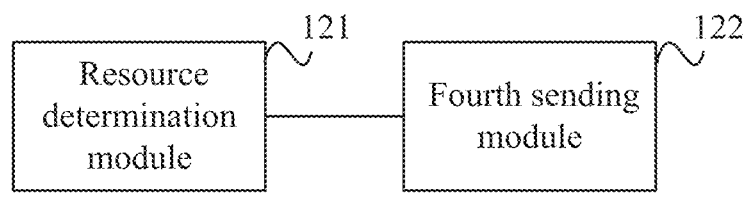
FIG. 12 is a structural diagram of another CHO resource processing apparatus according to an embodiment.

FIG. 12 is a structural diagram of a CHO resource processing apparatus according to an embodiment. As shown in FIG. 12, the CHO resource processing apparatus provided in this embodiment includes a resource determination module 121 and a fourth sending module 122.

The resource determination module 121 is configured to determine to change a resource of at least one CHO target cell configured by the UE. The fourth sending module 122 is configured to trigger to send CHO resource change notification indication information to a source base station of a UE, where the CHO resource change notification indication information is configured for notifying the source base station that the CHO target base station has determined to change the resource of the at least one CHO target cell of the UE.

The CHO resource processing apparatus provided in this embodiment is configured for implementing the CHO resource processing method of the embodiment shown in FIG. 8. The implementation principles and technical effects of the CHO resource processing apparatus provided in this embodiment are similar and are not repeated herein.

Figure 13:
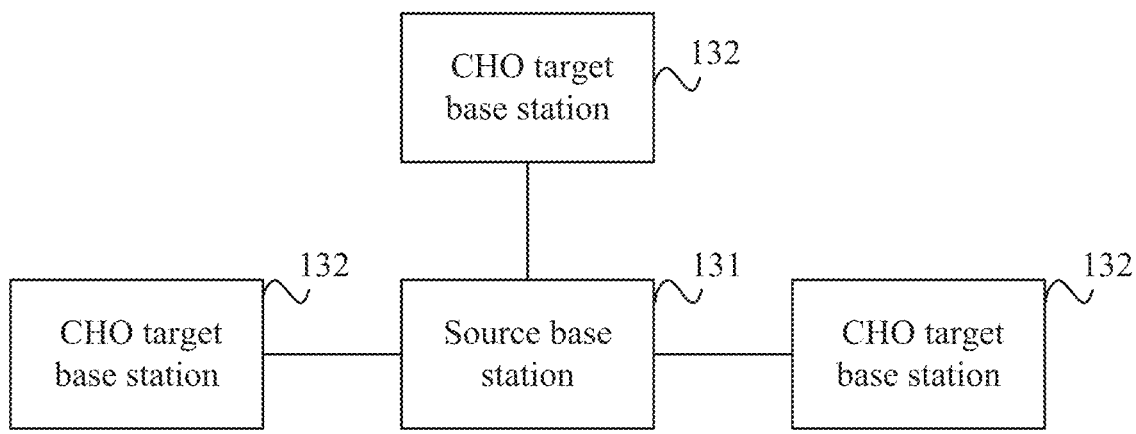
FIG. 13 is a structural diagram of a CHO resource processing system according to an embodiment.

FIG. 13 is a structural diagram of a CHO resource processing system according to an embodiment. As shown in FIG. 13, the CHO resource processing system provided in this embodiment includes a source base station 131 and a plurality of target base stations 132. The source base station 131 includes the CHO resource processing apparatus shown in FIG. 9. A CHO target base station 132 includes the CHO resource processing apparatus shown in FIG. 10. Alternative, the source base station 131 includes the CHO resource processing apparatus shown in FIG. 11. A CHO target base station 132 includes the CHO resource processing apparatus shown in FIG. 12. FIG. 13 illustrates the CHO resource processing system including three CHO target base stations 132 as an example but in practice the number of CHO target base stations 132 may be at least one.

Figure 14:
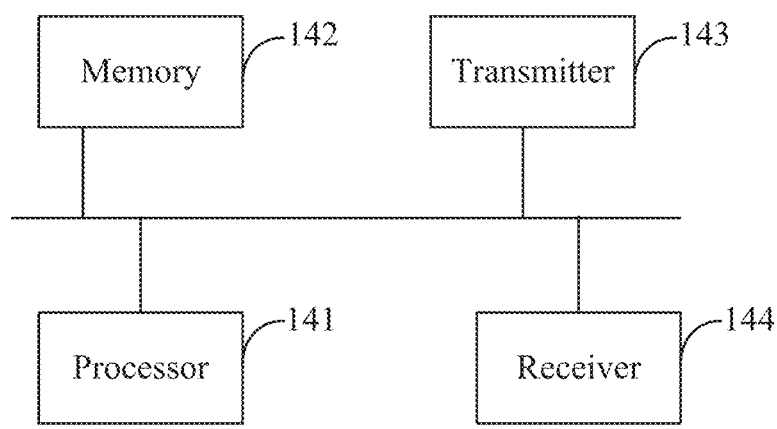
FIG. 14 is a structural diagram of a source base station according to an embodiment.

FIG. 14 is a structural diagram of a source base station according to an embodiment. As shown in FIG. 14, the source base station includes a processor 141, a memory 142, a transmitter 143 and a receiver 144. The number of the processors 141 in the source base station may be one or more, and one processor 141 is used as an example in FIG. 14. The processor 141 and the memory 142, and the transmitter 143 and the receiver 144 in the source base station may be connected through a bus or in other manners. In FIG. 14, the connection through the bus is used as an example.

The memory 142, as a computer-readable storage medium, may be configured to store software programs and computer-executable programs and modules, such as program instructions/modules (e.g., a first sending module 91 and a second sending module 92 in the CHO resource processing apparatus or a second receiving module 111 and a third sending module 112 in the CHO resource processing apparatus) corresponding to the CHO resource processing method in the embodiment shown in FIG. 5 or FIG. 7 of the present application. The processor 141 runs the software program, the instruction and the module that are stored in the memory 142 to execute at least one of the function applications and data processing of the source base station, that is, to implement the preceding CHO resource processing method.

The memory 142 may mainly include a program storage area and a data storage area. The program storage area may store an operating system and an application program required for implementing at least one function while the data storage area may store data created depending on use of terminals. Moreover, the memory 142 may include a high-speed random access memory, and may further include a nonvolatile memory such as at least one disk memory, flash memory or another nonvolatile solid state memory.

The transmitter 143 is a combination of modules or devices capable of transmitting radio frequency signals into space and includes, for example, a combination of a radio frequency transmitter, an antenna and another device. The receiver 144 is a combination of modules or devices capable of receiving radio frequency signals from space and includes, for example, a combination of a radio frequency receiver, an antenna and another device.

Figure 15:
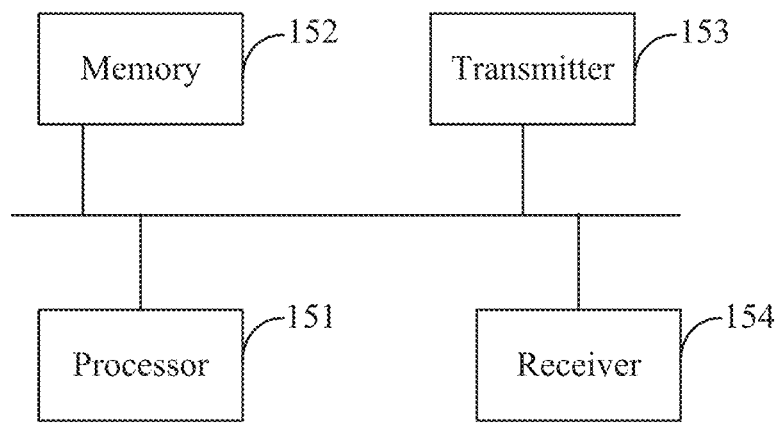
FIG. 15 is a structural diagram of a CHO target base station according to an embodiment.

FIG. 15 is a structural diagram of a CHO target base station according to an embodiment. As shown in FIG. 15, the CHO target base station includes a processor 151, a memory 152, a transmitter 153 and a receiver 154. The number of the processors 151 in the CHO target base station may be one or more, and one processor 151 is used as an example in FIG. 15. The processor 151 and the memory 152, and the transmitter 153 and the receiver 154 in the CHO target base station may be connected through a bus or in other manners. In FIG. 15, the connection through the bus is used as an example.

The memory 152, as a computer-readable storage medium, may be configured to store software programs and computer-executable programs and modules, such as program instructions/modules (e.g., a first receiving module 101 and a resource change module 102 in the CHO resource processing apparatus or a resource determination module 121 and a fourth sending module 122 in the CHO resource processing apparatus) corresponding to the CHO resource processing method in the embodiment shown in FIG. 6 or FIG. 8 of the present application. The processor 151 runs the software program, the instruction and the module that are stored in the memory 152 to execute at least one of the function applications and data processing of the CHO target base station, that is, to implement the preceding CHO resource processing method.

The memory 152 may mainly include a program storage area and a data storage area. The program storage area may store an operating system, at least one application required for functions. The data storage area may store data and the like created according to the use of the terminal. Moreover, the memory 152 may include a high-speed random access memory, and may further include a nonvolatile memory such as at least one disk memory, flash memory or another nonvolatile solid state memory.

The transmitter 153 is a combination of modules or devices capable of transmitting radio frequency signals into space and includes, for example, a combination of a radio frequency transmitter, an antenna and another device. The receiver 154 is a combination of modules or devices capable of receiving radio frequency signals from space and includes, for example, a combination of a radio frequency receiver, an antenna and another device.

The embodiment of the present application further provides a storage medium including computer executable instructions for executing a CHO resource processing method when the computer executable instructions are executed by the computer processor. The method includes sending, by a source base station of a UE, CHO resource change request indication information to at least one CHO target base station of the UE, where the CHO resource change request indication information is configured for indicating the at least one CHO target base station to change a resource of at least one CHO target cell of the UE; and sending, by the source base station, a CHO resource change notification to the UE, where the CHO resource change notification includes information indicating that the resource of the at least one CHO target cell is changed and an identifier of the at least one CHO target cell.

The embodiment of the present application further provides a storage medium including computer executable instructions for executing a CHO resource processing method when the computer executable instructions are executed by the computer processor. The method includes receiving, by at least one CHO target base station of a UE, CHO resource change request indication information sent by a source base station of the UE, where the CHO resource change request indication information is configured for indicating the at least one CHO target base station to change a resource of at least one CHO target cell of the UE; and changing, by the at least one CHO target base station, the resource of the at least one CHO target cell indicated by the CHO resource change request indication information.

The embodiment of the present application further provides a storage medium including computer executable instructions for executing a CHO resource processing method when the computer executable instructions are executed by the computer processor. The method includes receiving, by a source base station of a UE, CHO resource change notification indication information actively triggered and sent by a CHO target base station of the UE, where the CHO resource change notification indication information is configured for notifying the source base station that the CHO target base station has determined to change a resource of at least one CHO target cell of the UE; and sending, by the source base station, a CHO resource change notification to the UE, where the CHO resource change notification comprises information indicating that the resource of the at least one CHO target cell is changed and an identifier of the at least one CHO target cell. The embodiment of the present application further provides a storage medium including computer executable instructions for executing a CHO resource processing method when the computer executable instructions are executed by the computer processor. The method includes determining, by a CHO target base station of a UE, to change a resource of at least one CHO target cell configured by the UE; and triggering the CHO target base station and sending CHO resource change notification indication information to a source base station of the UE, where the CHO resource change notification indication information is configured for notifying the source base station that the CHO target base station has determined to change the resource of the at least one CHO target cell of the UE.

The above are only example embodiments of the present application and are not intended to limit the scope of the present application.

It is to be understood by those skilled in the art that the term "user terminal" covers any suitable type of radio UE, for example, a mobile phone, a portable data processing device, a portable web browser, or a vehicle-mounted mobile station.

In general, the embodiments of the present application may be implemented in hardware or dedicated circuits, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be in any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. A conditional handover (CHO) resource processing method, comprising:
   sending, by a source base station of a user equipment (UE), CHO resource change request indication information to at least one CHO target base station of the UE, wherein the CHO resource change request indication information is configured for indicating the at least one CHO target base station to change a resource of at least one CHO target cell of the UE; and
   sending, by the source base station, a CHO resource change notification to the UE, wherein the CHO resource change notification comprises information indicating that the resource of the at least one CHO target cell is changed and an identifier of the at least one CHO target cell;
   wherein before the sending, by the source base station of the UE, CHO resource change request indication information to at least one CHO target base station of the UE, the method further comprises:
   sending, by the source base station, CHO resource change license indication information to the CHO target base station, wherein the CHO resource change license indication information is configured for licensing whether the CHO target base station is capable of actively triggering to change the resource of the at least one CHO target cell, and wherein the sending, by the source base station, the CHO resource change request indication information to at least one CHO target base station of the UE comprises:

sending, by the source base station, the CHO resource change request indication information to the at least one CHO target base station of the UE through interface signaling among base stations.

2. The method of claim 1, wherein the CHO resource change request indication information comprises a radio resource management (RRM) measurement result associated with the at least one CHO target cell of the UE and the identifier of the at least one CHO target cell, and the RRM measurement result associated with the at least one CHO target cell of the UE is configured for causing the at least one CHO target base station to determine whether to change the resource of the at least one CHO target cell; and wherein before the sending, by the source base station of the UE, the CHO resource change request indication information to the at least one CHO target base station of the UE, the method further comprises:

receiving, by the source base station, the RRM measurement result associated with the at least one CHO target cell of the UE sent by the UE.

3. The method of claim 1, wherein the CHO resource change request indication information comprises an expected probability factor associated with the at least one CHO target cell of the UE, and the expected probability factor is configured for representing a degree to which the source base station expects the at least one CHO target cell to change a resource.

4. A conditional handover (CHO) resource processing method, comprising:

receiving, by a source base station of a user equipment (UE), CHO resource change notification indication information sent by a CHO target base station of the UE through actively triggering, wherein the CHO resource change notification indication information is configured for notifying the source base station that the CHO target base station has determined to change a resource of at least one CHO target cell of the UE; and sending, by the source base station, a CHO resource change notification to the UE, wherein the CHO resource change notification comprises information indicating that the resource of the at least one CHO target cell is changed and an identifier of the at least one CHO target cell;

wherein before the receiving, by the source base station of the UE, the CHO resource change notification indication information sent by the CHO target base station of the UE, the method further comprises:

sending, by the source base station, CHO resource change license indication information to the CHO target base station, wherein the CHO resource change license indication information is configured for licensing whether the CHO target base station is capable of actively triggering to change the resource of the at least one CHO target cell; and wherein the receiving, by the source base station of the UE, the CHO resource change notification indication information sent by the CHO target base station of the UE comprises:

receiving, by the source base station of the UE, the CHO resource change notification indication information sent by the CHO target base station of the UE through interface signaling among base stations.

5. The method of claim 4, wherein the CHO resource change notification indication information comprises a reason for changing the resource of the at least one CHO target cell and the identifier of the at least one CHO target cell.

6. The method of claim 4, wherein the CHO resource change notification indication information comprises a pre-configured expected probability factor associated with the at least one CHO target cell, and the pre-configured expected probability factor is configured for representing a degree to which the at least one CHO target cell expects a resource to be pre-configured by a CHO again.

7. The method of claim 4, after the receiving, by the source base station of the UE, the CHO resource change notification indication information sent by the CHO target base station of the UE, further comprising:

sending, by the source base station, CHO resource change notification feedback information to the CHO target base station, wherein the CHO resource change notification feedback information comprises information indicating that the source base station determines that the resource of the at least one CHO target cell is changed, and the identifier of the at least one CHO target cell.

8. The method of claim 4, wherein the CHO resource change notification indication information comprises at least one of CHO resource release notification indication information, CHO resource cancel notification indication information or CHO resource modification notification indication information.

9. A conditional handover (CHO) resource processing method, comprising:

determining, by a CHO target base station of a user equipment (UE), to change a resource of at least one CHO target cell configured by the UE; and triggering, by the CHO target base station, the CHO target base station to send CHO resource change notification indication information to a source base station of the UE, wherein the CHO resource change notification indication information is configured for notifying the source base station that the CHO target base station has determined to change the resource of the at least one CHO target cell of the UE;

wherein before the triggering, by the CHO target base station, the CHO target base station to send CHO resource change notification indication information to a source base station of the UE, the method further comprises:

receiving, by the CHO target base station, CHO resource change license indication information sent by the source base station, wherein the CHO resource change license indication information is configured for licensing whether the CHO target base station is capable of actively triggering to change the resource of the at least one CHO target cell; and the triggering, by the CHO target base station, the CHO target base station to send the CHO resource change notification indication information to the source base station of the UE comprises:

sending, by the CHO target base station, the CHO resource change notification indication information to the source base station of the UE through interface signaling among base stations.

10. The method of claim 9, wherein the CHO resource change notification indication information comprises a reason for changing the resource of the at least one CHO target cell and an identifier of the at least one CHO target cell.

11. The method of claim 9, wherein the CHO resource change notification indication information comprises a pre-configured expected probability factor associated with the at least one CHO target cell, and the pre-configured expected probability factor is configured for representing a degree to which the at least one CHO target cell expects a resource to be pre-configured by a CHO again.

12. The method of claim 9, after the triggering the CHO target base station to send the CHO resource change notification indication information to the source base station of the UE actively, further comprising:
   receiving, by the CHO target base station, CHO resource change notification feedback information sent by the source base station, wherein the CHO resource change notification feedback information comprises information indicating that the source base station determines that the resource of the at least one CHO target cell is changed, and the identifier of the at least one CHO target cell.

13. The method of claim 9, wherein the CHO resource change notification indication information comprises at least one of CHO resource release notification indication information, CHO resource cancel notification indication information or CHO resource modification notification indication information.

14. A conditional handover (CHO) resource processing apparatus, comprising: at least one processor; and a memory for storing instructions executable by the at least one processor, wherein the at least one processor is configured to perform the CHO resource processing method of claim 1.

15. A conditional handover (CHO) resource processing apparatus, comprising: at least one processor; and a memory for storing instructions executable by the at least one processor, wherein the at least one processor is configured to perform the CHO resource processing method of claim 4.

16. A conditional handover (CHO) resource processing apparatus, comprising: at least one processor; and a memory for storing instructions executable by the at least one processor, wherein the at least one processor is configured to perform the CHO resource processing method of claim 9.

* * * * *